United States Patent
Yoshida et al.

(10) Patent No.: US 12,304,000 B2
(45) Date of Patent: May 20, 2025

(54) JOINING METHOD

(71) Applicant: NIPPON LIGHT METAL COMPANY, LTD., Tokyo (JP)

(72) Inventors: Ryo Yoshida, Shizuoka (JP); Hiroshi Kaneki, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 384 days.

(21) Appl. No.: 17/788,668

(22) PCT Filed: Dec. 2, 2020

(86) PCT No.: PCT/JP2020/044889
§ 371 (c)(1),
(2) Date: Jun. 23, 2022

(87) PCT Pub. No.: WO2021/131560
PCT Pub. Date: Jul. 1, 2021

(65) Prior Publication Data
US 2023/0042870 A1    Feb. 9, 2023

(30) Foreign Application Priority Data

Dec. 25, 2019 (JP) .................................. 2019-234528

(51) Int. Cl.
*B23K 26/348* (2014.01)
*B23K 9/16* (2006.01)

(52) U.S. Cl.
CPC .............. *B23K 26/348* (2015.10); *B23K 9/16* (2013.01)

(58) Field of Classification Search
CPC ............ B23K 2101/18; B23K 2103/10; B23K 26/244; B23K 26/26; B23K 26/32; B23K 26/348; B23K 9/16
See application file for complete search history.

(56) References Cited

U.S. PATENT DOCUMENTS

| | | | |
|---|---|---|---|
| 2006/0175315 A1* | 8/2006 | Wang | B23K 26/0608 219/121.64 |
| 2011/0215074 A1* | 9/2011 | Wang | B23K 26/348 219/121.64 |
| 2018/0236600 A1* | 8/2018 | Vila I Ferrer | B23K 35/0238 |

FOREIGN PATENT DOCUMENTS

| | | |
|---|---|---|
| CN | 103056533 A | 4/2013 |
| JP | 2001-246485 A | 9/2001 |

(Continued)

OTHER PUBLICATIONS

Office Action for Chinese Patent Application No. 202080089755.7 (Jun. 5, 2023).

(Continued)

*Primary Examiner* — Ibrahime A Abraham
*Assistant Examiner* — Joe E Mills, Jr.
(74) *Attorney, Agent, or Firm* — Merchant & Gould P.C.

(57) ABSTRACT

A joining method includes: an overlapping step of overlapping a front surface of a first metal member with a back surface of a second metal member; and a welding step of welding the first metal member with the second metal member by hybrid welding, using a hybrid welding machine including a leading laser welding unit and a trailing arc welding unit. In the welding step, laser welding, by irradiating with a laser beam, and arc welding are performed from a front surface of the second metal member, along a preset travel route which is set on an overlapped part formed by the first metal member and the second metal member overlapped with each other, to the overlapped part, and the laser beam is oscillated to cross the preset travel route.

3 Claims, 15 Drawing Sheets

(56) References Cited

FOREIGN PATENT DOCUMENTS

| | | |
|---|---|---|
| JP | 2003-170285 A | 6/2003 |
| JP | 2008-194730 A | 8/2008 |
| JP | 2016-030289 A | 3/2016 |

OTHER PUBLICATIONS

International Search Report for PCT/JP2020/044889 (Jan. 19, 2021).

* cited by examiner

FIG. 8

| No. | METHOD | WELDING SPEED (m/min) | LASER POWER (kW) | WELDING CURRENT (A) | WELDING VOLTAGE (%) | LASER OSCILLATION AMPLITUDE (mm) | LASER FREQUENCY (Hz) | TRAVEL ANGLE (deg) LASER θ1 | TRAVEL ANGLE (deg) ARC θ2 | WORK ANGLE (deg) LASER θ3 | WORK ANGLE (deg) ARC θ4 |
|---|---|---|---|---|---|---|---|---|---|---|---|
| 1 | COMPARATIVE EXAMPLE | 2 | 4 | 120 | -5 | — | — | 10 | 30 | 90 | 90 |
| 2 | COMPARATIVE EXAMPLE | 3 | 4 | 150 | -5 | — | — | 10 | 30 | 90 | 90 |
| 3 | COMPARATIVE EXAMPLE | 4 | 4 | 150 | -5 | — | — | 10 | 30 | 90 | 90 |
| 4 | COMPARATIVE EXAMPLE | 5 | 4 | 150 | -5 | — | — | 10 | 30 | 90 | 90 |
| 5 | COMPARATIVE EXAMPLE | 6 | 4 | 150 | -5 | — | — | 10 | 30 | 90 | 90 |
| 5 | COMPARATIVE EXAMPLE | 6 | 8 | 150 | -5 | — | — | 10 | 30 | 90 | 90 |
| 6 | COMPARATIVE EXAMPLE | 8 | 4 | 150 | -5 | — | — | 10 | 30 | 90 | 90 |
| 6 | COMPARATIVE EXAMPLE | 8 | 8 | 200 | -12 | 1.6 | 470 | 10 | 30 | 90 | 90 |
| 7 | WORKING EXAMPLE | 3 | 10 | 200 | -12 | 1.6 | 470 | 10 | 30 | 90 | 90 |
| 8 | WORKING EXAMPLE | 5 | 10 | 200 | -12 | 1.6 | 470 | 10 | 30 | 90 | 90 |
| 9 | WORKING EXAMPLE | 6 | 10 | 200 | -12 | 1.6 | 470 | 10 | 30 | 90 | 90 |
| 10 | WORKING EXAMPLE | 7 | 10 | 200 | -12 | 1.6 | 470 | 10 | 30 | 90 | 90 |
| 11 | WORKING EXAMPLE | 8 | 10 | 200 | -12 | 1.6 | 470 | 10 | 30 | 90 | 90 |

FIG. 14

| No. | THICKNESS OF UPPER MEMBER (mm) | WELDING SPEED (m/min) | ARC CONDITION | | LASER CONDITION | | | RATIO OF AMPLITUDE TO UPPER PLATE THICKNESS $\alpha$ |
|---|---|---|---|---|---|---|---|---|
| | | | WELDING CURRENT (A) | WELDING VOLTAGE (%) | LASER POWER (kW) | OSCILLATION AMPLITUDE [mm] | FREQUENCY [Hz] | |
| 21 | 4 | 3 | 231 | −12 | 10 | 0 | — | 0.00 |
| 22 | 4 | 3 | 231 | −12 | 10 | 0.8 | 700 | 0.20 |
| 23 | 4 | 3 | 231 | −12 | 10 | 1.6 | 474 | 0.40 |
| 24 | 4 | 3 | 231 | −12 | 10 | 2.4 | 387 | 0.60 |
| 25 | 4 | 3 | 231 | −12 | 10 | 3.2 | 335 | 0.80 |
| 26 | 4 | 3 | 231 | −12 | 10 | 4 | 300 | 1.00 |
| 27 | 3 | 3 | 231 | −12 | 10 | 0.8 | 700 | 0.27 |
| 28 | 3 | 3 | 231 | −12 | 10 | 1.6 | 474 | 0.53 |
| 29 | 3 | 3 | 231 | −12 | 10 | 2.4 | 387 | 0.80 |
| 30 | 3 | 3 | 231 | −12 | 10 | 3.2 | 335 | 1.07 |
| 31 | 3 | 3 | 231 | −12 | 10 | 4 | 300 | 1.33 |
| 32 | 3 | 3 | 231 | −12 | 10 | 4.8 | 274 | 1.60 |

JOINING METHOD

This application is a National Stage Application of PCT/JP2020/044889, filed Dec. 2, 2020, which claims benefit of priority to Application No. 2019-234528, filed Dec. 25, 2019 in Japan, and which applications are incorporated herein by reference. To the extent appropriate, a claim of priority is made to each of the above disclosed applications.

TECHNICAL FIELD

The present invention relates to a joining method.

BACKGROUND ART

Arc welding, laser welding, hybrid welding, and the like have been known as methods for forming a lap joint by overlapping metal members and executing welding from a front surface of an upper metal member. Arc welding is performed with a filler material being supplied, to have an advantage that a wider misalignment margin is secured for a welded position. Meanwhile, arc welding has disadvantages that a welding speed is slow, and a penetration depth is small. In arc welding, if a welding speed is set high, weld metal is insufficient to incur a disadvantage that joint strength is decreased.

Laser welding has an advantage that a welding speed can be increased more than that of arc welding. Meanwhile, in laser welding, no filler material is added, to have a disadvantage that a margin is significantly small for a welded part.

In hybrid welding, a hybrid welding machine is used that includes a leading laser welding unit and a trailing arc welding unit (see Patent Literature 1). With hybrid welding, the disadvantages of laser welding and arc welding can be compensated for the welding.

CITATION LIST

Patent Literature 1: Japanese Patent Application Publication No. 2016-30289

SUMMARY OF INVENTION

Problem to be Solved

However, hybrid welding still has the phenomenon that, if a welding speed is set high, the weld metal is insufficient to have a problem of joint strength decreased at the lap joint. Recently, a weld length has been increased with an object to be welded increasing in size, and therefore an increase in welding speed is desired.

In view of the above, the present invention is intended to provide a joining method which can achieve an increase in welding speed and improvement in joint strength between metal members.

Solution to Problem

To solve the problem described above, the present invention provides a joining method including an overlapping step of overlapping a front surface of a first metal member with a back surface of a second metal member; and a welding step of welding the first metal member with the second metal member by hybrid welding, with use of a hybrid welding machine including a leading laser welding unit and a trailing arc welding unit, wherein, in the welding step, laser welding, by irradiating with a laser beam, and arc welding are performed from a front surface of the second metal member, along a preset travel route which is set on an overlapped part formed by the first metal member and the second metal member overlapped with each other, on the overlapped part, and the laser beam is oscillated to cross the preset travel route.

According to the joining method, the laser beam is oscillated so that a penetration width can be increased, and a weld width of weld metal can be increased at the overlapped part between the first metal member and second metal member. This can achieve both an increase in welding speed and improvement in joint strength.

Further, in the welding step, a welding speed is preferably set in a range of 2-10 m/min.

Still further, a function $\alpha$, which is obtained by dividing oscillation amplitude $\lambda$ of the laser beam by a plate thickness t of the second metal member is preferably set in a range of 0.2-1.6.

Yet further, the first metal member is preferably made of aluminum or an aluminum alloy, and the second metal member is preferably made of aluminum or an aluminum alloy.

According to the joining method, joining is more suitably performed.

Advantageous Effects of Invention

A joining method according to the present invention can achieve an increase in welding speed and improvement in joint strength between metal members.

BRIEF DESCRIPTION OF DRAWINGS

FIG. 8 is a table of welding conditions of comparative examples and working examples in Test 1;

FIG. 14 is a table of welding conditions of comparative examples and working examples in Test 2;

DETAILED DESCRIPTION OF THE INVENTION

Figure 1:
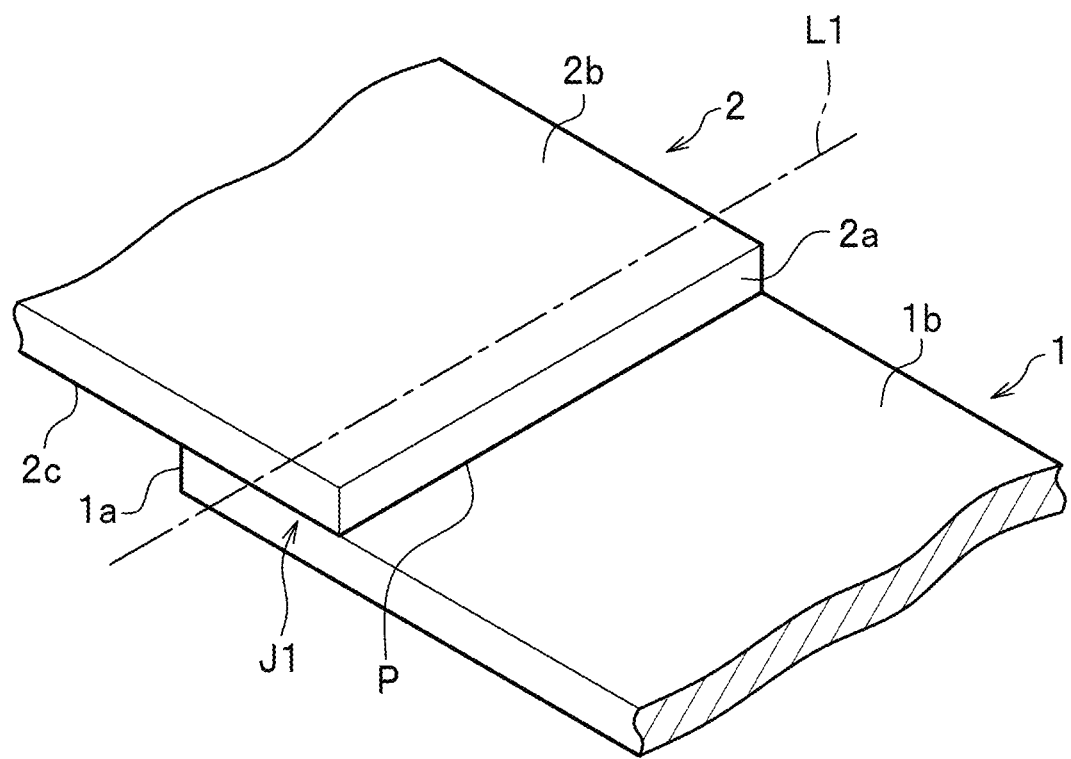
FIG. 1 is a perspective view showing an overlapping step of a joining method according to an embodiment of the present invention.

A description is given in detail of a joining method according to an embodiment of the present invention, with reference to drawings. The present invention is not limited only to the embodiment described below. Further, some or all components in the embodiment may be combined as appropriate. As shown in FIG. 1, in the joining method according to the present embodiment, a second metal member 2 is overlapped, and then joined by welding, with a first metal member 1 so as to form a lap joint. The joining method according to the present embodiment includes an overlapping step and a welding step. Note that, a "front surface" in the description denotes a surface on the opposite side of a "back surface". Note that, in the description, when a numerical range is defined by a lower limit and an upper limit with a symbol "-", both the lower and upper limits are included in the range.

In the overlapping step, as shown in FIG. 1, the second metal member 2 is overlapped with the first metal member 1. The first metal member 1 and second metal member 2 may have any shape, and, in the present embodiment, both have a plate shape. The first metal member 1 and second metal member 2 are properly selected from weldable metals such as aluminum, an aluminum alloy, copper, a copper alloy, titanium, a titanium alloy, an iron steel, and a stainless steel. Of these, aluminum or an aluminum alloy is preferably used as the first metal member 1 and second metal member 2. That is, the first metal member 1 is preferably made of aluminum or an aluminum alloy. Further, the second metal member 2 is preferably made of aluminum or an aluminum alloy. In the present embodiment, a case where the first metal member 1 and second metal member 2 are made of an aluminum alloy is described.

In the overlapping step, a front surface 1b of the first metal member 1 is overlapped with a back surface 2c of the second metal member 2. In the overlapping step, having the front surface 1b of the first metal member 1 overlapped with the back surface 2c of the second metal member 2 forms an overlapped part J1. An end surface 1a of the first metal member 1 is located under the back surface 2c of the second metal member 2. The front surface 1b of the first metal member 1 and an end surface 2a of the second metal member 2 form an inner corner portion. A "preset travel route L1" is set on the overlapped part J1 as a welded position by laser welding and arc welding. More specifically, the "preset travel route L1" is set, in parallel to the end surface 2a, on the front surface 2b of the second metal member 2 at a position corresponding to the overlapped part J1.

Figure 2:
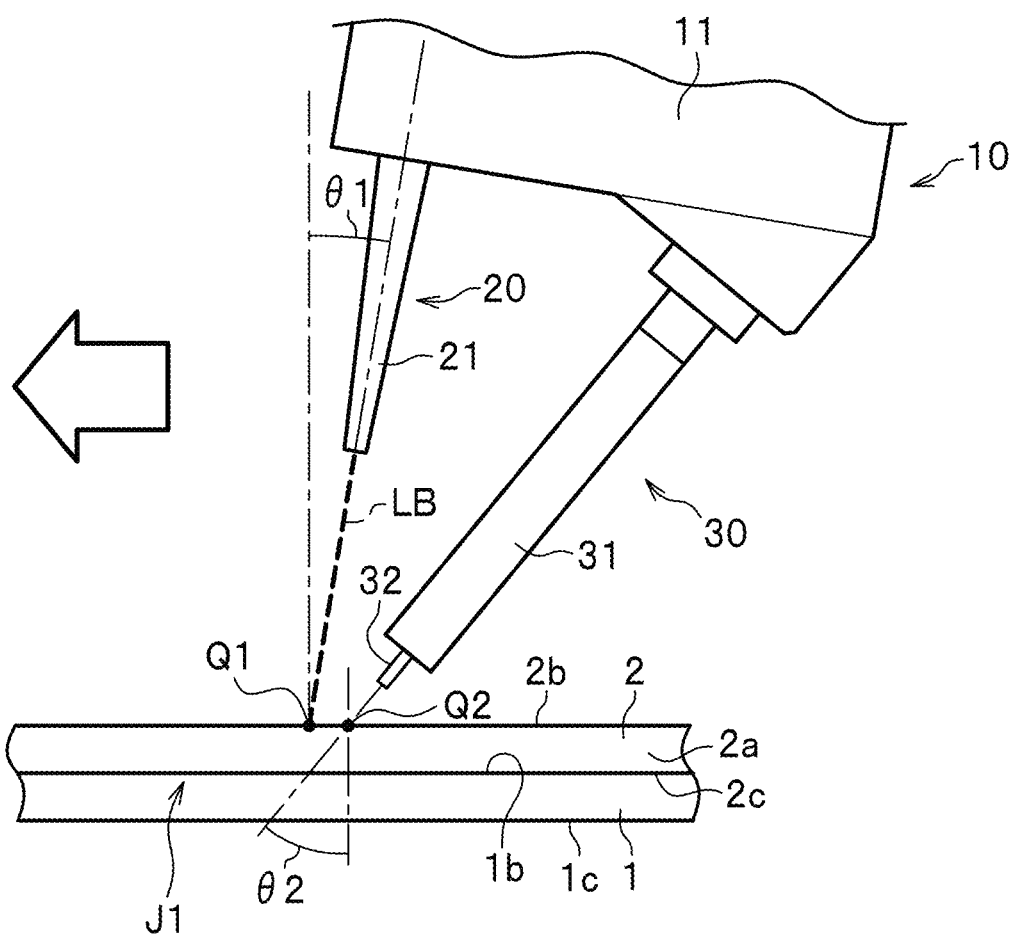
FIG. 2 is a side view showing a welding step of the joining method according to the present embodiment.

In the welding step, as shown in FIG. 2, the overlapped part J1, in which the first metal member 1 is overlapped with the second metal member 2, is welded with use of a hybrid welding machine 10. In the welding step, the first metal member 1 and second metal member 2 are welded to each other by laser-arc hybrid welding using laser welding and arc welding. In FIG. 2, the hybrid welding machine 10 travels from right to left such that a laser welding unit 20 takes a lead. Note that applied arc welding includes gas shielded arc welding such as MIG welding, MAG welding, carbon dioxide gas arc welding, and TIG welding. Of these, MIG welding is preferably used for reasons that MIG welding is suitable for automation using a robot arm and less likely causes oxidation of joined members due to shielding gas. In the present embodiment, a case where MIG welding is applied as arc welding is described by way of example.

The hybrid welding machine 10 includes a connecting unit 11, the laser welding unit 20, and an arc welding unit 30. The connecting unit 11 is attached to a distal end of an arm robot, for example. The laser welding unit 20 is provided with a laser head 21 and is formed at one end of the connecting unit 11. A laser beam LB is radiated from the laser head 21. Note that MIG welding is performed as arc welding in the present embodiment as described above, so that the "arc welding unit 30" is referred to as "MIG welding unit 30" hereinbelow.

The MIG welding unit 30 includes an arc torch 31 and is formed at the other end of the connecting unit 11. The arc torch 31 supplies a filler material 32 and generates a MIG arc 33 (see FIG. 7) at a distal end thereof.

Figure 3:
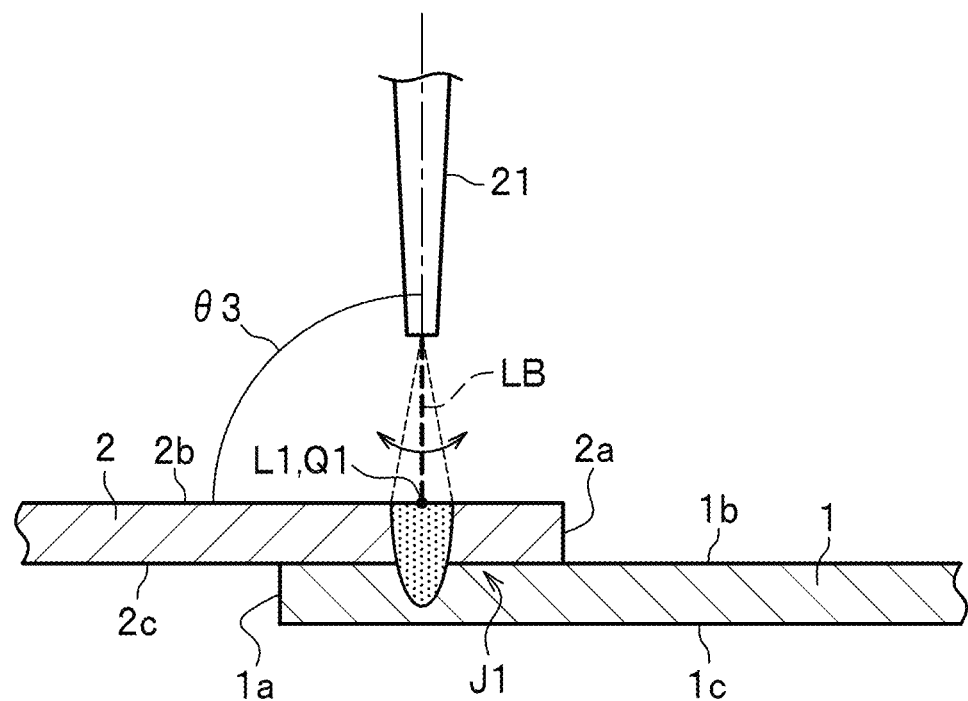
FIG. 3 is a cross-sectional view showing laser welding in the welding step of the joining method according to the present embodiment.

As shown in FIG. 2, a travel angle θ1 of a shaft of the laser head 21 is set to 10°, for example. The travel angle is a tilt angle of the shaft of the laser head 21 with respect to the vertical axis, in a side view of the hybrid welding machine 10 with respect to a welding direction. The travel angle θ1 may be set properly in a range of −10 to 10° with respect to the vertical axis. As shown in FIG. 3, a work angle θ3 of the shaft of the laser head 21 is set to 90°, for example. The work angle θ3 is an opening angle from the front surface 1b of the first metal member 1 to the shaft of the laser head 21, as viewed in the welding direction.

Figure 4:
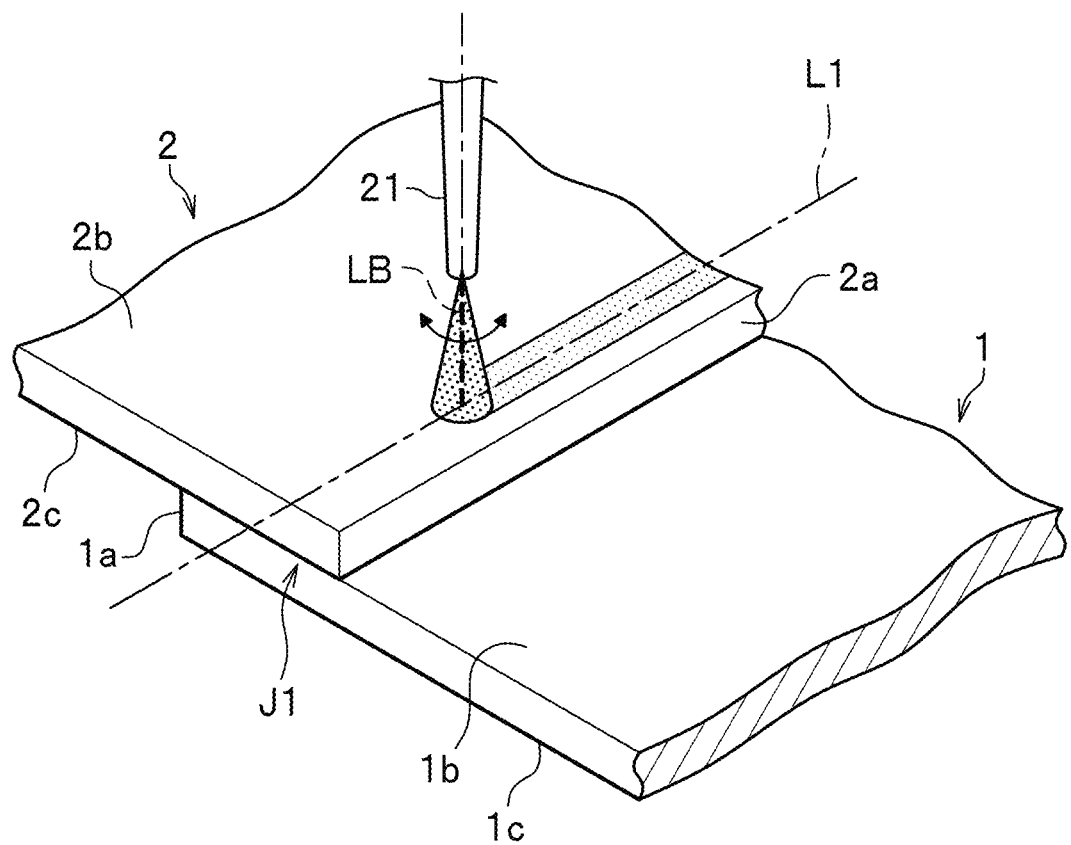
FIG. 4 is a perspective view of a scene, showing oscillation of the laser welding in the welding step of the joining method according to the present embodiment.

As shown in FIG. 4, in the welding step, the laser beam LB is oscillated for welding. In the welding step, the laser beam LB is oscillated to cross the preset travel route L1 while the laser welding unit 20 is traveled along the preset travel route L1. That is, the center of oscillation of the laser beam LB (welded position Q1: FIG. 3) is set on the preset travel route L1 while the laser welding unit 20 is traveled to trace the preset travel route L1. In other words, the laser beam LB is oscillated to cross a welding route by arc welding. An oscillation amplitude of the laser beam LB is properly set and may be set in a range of 0.3-10 mm, for example. The oscillation amplitude of the laser beam LB is preferably 0.5 mm or more, more preferably 0.8 mm or more, and even more preferably 1 mm or more, but preferably 5 mm or less, more preferably 4 mm or less, and even more preferably 3 mm or less. The oscillation amplitude of the laser beam LB being set equal to or more than the lower limit of the above range allows for increasing a weld width, to likely increase joint strength. The oscillation amplitude of the laser beam LB being equal to or less than the upper limit of the above range allows for limiting an area irradiated with the laser beam to an area where heat conduction by arc welding is transferred, to secure weld penetration by the laser beam, so that joint strength is effectively improved. Note that, in the present specification, an oscillation amplitude of the laser beam LB denotes a length from one endmost position to the other endmost position of an irradiated position. Further, the oscillation amplitude of the laser beam LB denotes a length in a plane orthogonal to the central axis of oscillation of the laser beam LB. Still further, a frequency may be in a range of 250-800 Hz, preferably in a range of 270-700 Hz. Yet further, it is preferable to set power of the laser beam LB to a level that a keyhole KH (see FIG. 7) by laser welding is formed in the first metal member 1.

Note that, in the present embodiment, the laser beam LB is made to linearly reciprocate with respect to the preset travel route L1, to oscillate in zigzag in the welding direction, but is not limited thereto. For example, the laser beam LB may be oscillated to trace a wave, a circle, an elliptic, a polygon, or a combination of these, so as to cross the preset travel route L1.

Figure 5:
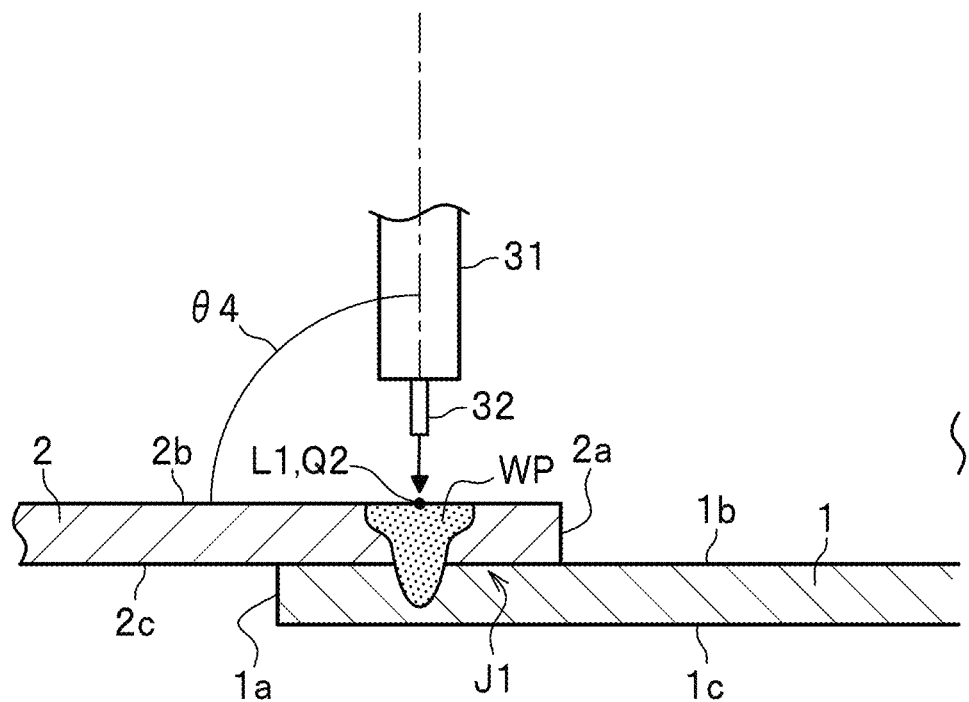
FIG. 5 is a cross-sectional view showing MIG welding in the welding step of the joining method according to the present embodiment.

As shown in FIG. 2, a travel angle θ2 of a shaft of the arc torch 31 is set to 30°, for example. The travel angle θ2 may be set properly in a range of 10-50°. As shown in FIG. 5, a work angle θ4 of the shaft of the arc torch 31 is set to 90°, for example. The work angle θ4 is an opening angle from the front surface 1b of the first metal member 1 to the shaft of the arc torch 31, as viewed in the welding direction. A welded position Q2 by the MIG arc 33 (see FIG. 7) generated from the arc torch 31 is set on the preset travel route L1.

In the welding step, as shown in FIG. 3, laser welding is performed by the laser beam LB radiated from the leading laser head 21. The welded position Q1 by the laser beam LB is set on the preset travel route L1 and welding is performed while the laser beam LB is oscillated so as to cross the preset travel route L1. The laser beam LB is oscillated so that the vicinity of the preset travel route L1 melts widely, as compared with a case where the laser beam LB is not oscillated.

Figure 6:
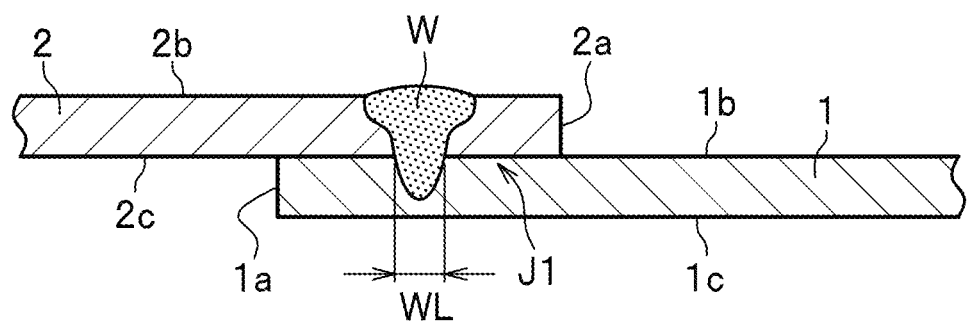
FIG. 6 is a cross-sectional view of a scene after the welding step of the joining method according to the present embodiment.
Figure 7:
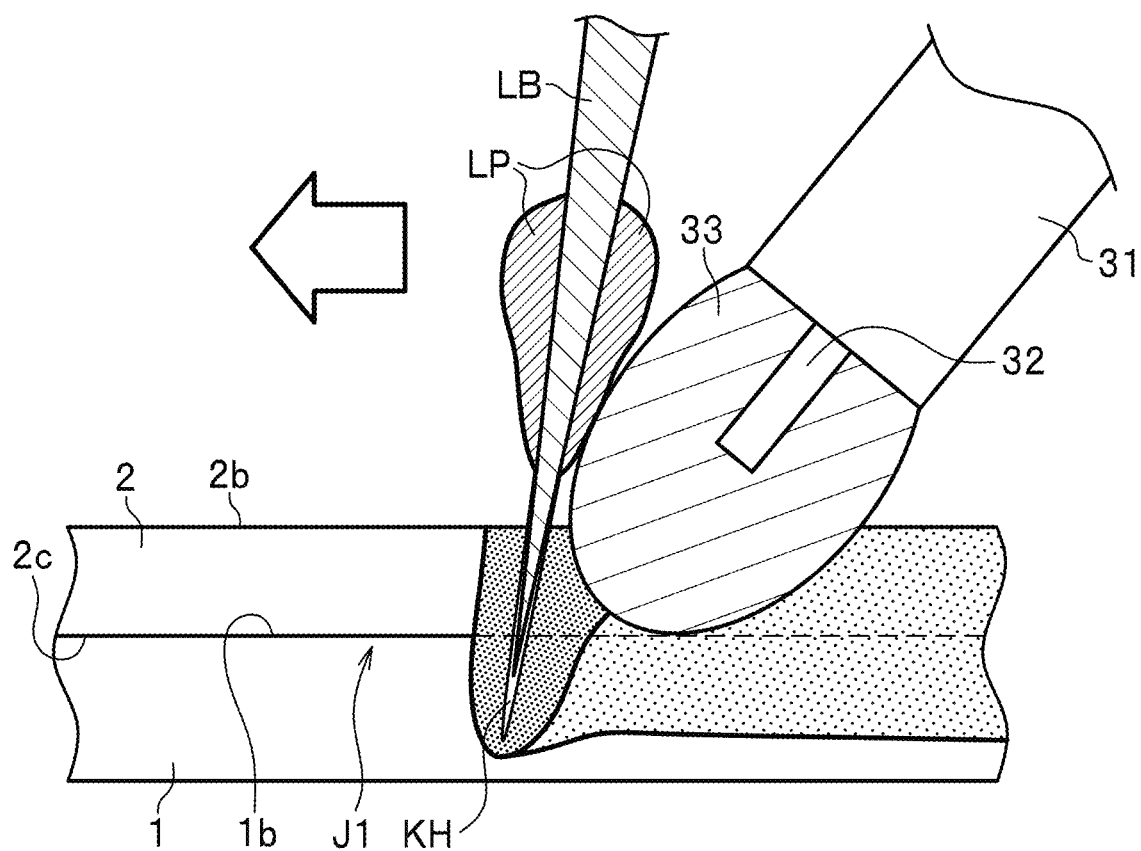
FIG. 7 is a schematic view in the welding step of the joining method according to the present embodiment, as viewed from a side.

In the welding step, as shown in FIG. 5, MIG welding is performed by the arc torch 31 trailing the laser head 21. The welded position Q2 by the arc torch 31 is set to overlap the preset travel route L1. A distance between the welded position Q1 and the welded position Q2 may be properly set within 0-5 mm, for example. As also shown in FIG. 7, the trailing MIG arc 33 is guided to a cathode spot (laser-induced plasma LP generated at a portion, closer to a distal end, of the laser beam LB) generated by laser welding. A weld pool WP (see FIG. 5) formed by the MIG arc 33 is merged with a melt portion by the laser beam LB, to form a weld metal (weld bead) W as shown in FIG. 6. The weld metal W is formed to penetrate the overlapped part J1 and to bulge with respect to the front surface 2b of the second metal member 2.

In the welding step, a welding speed may be set properly to a condition in which the overlapped part J1 can be welded, and is preferably set in a range of 2-10 m/min. The welding speed is more preferably set to 3 m/min or more, even more preferably 4 m/min or more, but more preferably 8 m/min or less, even more preferably 6 m/min or less. The welding speed being set equal to or more than the lower limit of the above range allows for performing the welding at a high speed, to have even a welded object, having a long welding length, welded in a short time. The welding speed being equal to or less than the upper limit of the above range allows for obtaining a sufficient weld width, to easily suppress a decrease in joint strength.

Here, according to conventional hybrid welding, when a welding speed is relatively low, both advantages of an increased weld width by arc welding and a deep penetration depth by laser welding can be combined. However, when a welding speed is increased, disadvantages are created such that a weld width by arc welding becomes narrow, and an area irradiated with the leading laser beam is small to have a small penetration width, resulting in a small weld metal. That is, in the conventional hybrid welding, a weld width becomes narrow to have joint strength decreased when a welding speed is high.

In contrast, according to the joining method of the present embodiment described above, the laser beam LB is oscillated to cross the preset travel route L1 while the laser welding unit 20 is traveled along the preset travel route L1, to increase a penetration width around the preset travel route L1. Accordingly, as shown in FIG. 6, this increases a width of a weld width WL at the overlapped part J1 and joint strength. In other words, a metal melted by the leading laser beam LB is used as weld metal by the trailing MIG welding, so that the weld metal W can be increased in cooperation with the filler material 32. As a result, a welding speed is increased and a decrease in joint strength is suppressed so that joint strength is maintained.

Further, the laser beam LB being oscillated allows for increasing weld metal and robustness to allowance for a gap between metal members or misalignment of a welded position.

Further, as in the welding step of the present embodiment, the distance between the welded position Q1 by the leading laser beam LB and the welded position Q2 by the trailing MIG arc 33 is preferably set to 0-5 mm. The distance between the welded position Q1 and the welded position Q2 being set equal to or greater than the lower limit of the above range allows for preventing arc welding from leading laser welding, and for maintaining the distance between the laser head 21 and the arc torch 31 to facilitate joining. Still further, the distance between the welded position Q1 and the welded position Q2 being set equal to or less than the upper limit of the above range allows the cathode spot of laser welding to suitably guide the MIG arc 33. Accordingly, welding is performed at a high speed without causing the weld bead (weld metal W) to be meandered.

In the welding step, a function α, obtained by dividing oscillation amplitude λ of the laser beam LB by a plate thickness t of the second metal member 2, is preferably set in a range of 0.2-1.6. The function α is preferably 0.4 or more, even more preferably 0.5 or more, especially preferably 0.6 or more, but more preferably 1.4 or less, and even more preferably 1.1 or less. The inventors have investigated and found that, when welding the overlapped part J1, formed by the first metal member 1 and second metal member 2 overlapped with each other, is executed from the front surface 2b of the second metal member 2, there is a relationship between joint strength and the function α. That is, it has become evident that even in a case where a plate thickness of the second metal member 2 is varied, desired joint strength can be obtained in a case where laser oscillation amplitude is controlled in accordance with the plate thickness when the function α is within the given range described above. Setting the function α equal to or more than the lower limit of the above range easily improves joint strength. That is, making laser oscillation amplitude sufficiently large to a plate thickness of an upper member increases joint strength. Meanwhile, setting the function α equal to or less than the upper limit of the above range maintains an irradiated area with the laser beam within an area where heat conduction by arc welding is transferred, to effectively improve joint strength. Further, a weld defect can be easily suppressed. Still further, a poor appearance due to an excessive build-up by arc welding can be easily prevented.

Working Examples

Next, a description is given of working examples according to the present embodiment. Test 1 and Test 2 were conducted. Test 1 was intended to confirm a relationship between a welding speed and joint strength. Test 2 was intended to confirm a relationship between a plate thickness of an upper plate, oscillation amplitude, and the joint strength.

<Test 1>

In Test 1, the first metal member 1 was joined with the second metal member 2 with use of the hybrid welding machine 10, to obtain test pieces each having a lap joint. Further, a tensile test piece and a cross-sectional observation test piece were prepared from each test piece to perform a joint strength test (tensile test) on the lap joint and to observe a macroscopic cross-section thereof. FIG. 8 is a table showing welding conditions of comparative examples and working examples in Test 1. In the comparative examples, hybrid welding was performed without oscillating the laser beam LB, and, in the working examples, hybrid welding was performed by oscillating the laser beam LB as in the embodiment described above.

In both the comparative examples and working examples, an aluminum alloy A6061-T6 was used as the first metal member 1, having a thickness t of 5 mm, a width of 150 mm, and a length of 150 mm. In both the comparative examples and working examples, an aluminum alloy A5052-H34 was used as the second metal member 2, having a thickness t of 2 mm, a width of 150 mm, and a length of 150 mm. A width (overlapped margin) of the overlapped part J1 was set to 60 mm. At the center in the width direction of the overlapped part J1, the preset travel route L1 was set in parallel to the end surface 2a of the second metal member 2. The first metal member 1 and second metal member 2 overlapped with each other, were welded together to prepare a test piece, and then, a rectangular-shaped tensile test piece in a planar view, having a total length of 240 mm in a direction orthogonal to the preset travel route L1 in a planar view of the test piece and a width of 20 mm, was cut out for the tensile test. Further, a rectangular-shaped cross-sectional observation test piece in a planar view, having a total length of 45 mm including a length of 15 mm extending from a corner P, where the front surface 1b of the first metal member 1 intersects the end surface 2a of the second metal member 2, toward the second metal member 2 and a length of 30 mm extending from the corner P away from the second metal member 2, and a width of 20 mm, was cut out for cross-sectional observation.

As shown in FIG. 8, welding speeds for the comparative examples were set at 2, 3, 4, 5, 6, and 8 (m/min). In accordance with the welding speeds, test pieces NOS. 1 to 6 of the comparative examples were set (two kinds of test pieces were set for NOS. 5 and 6, with different laser power). Welding speeds for the working examples were set at 3, 5, 6, 7, and 8 (m/min). In accordance with the welding speeds, test pieces NOS. 7 to 11 of the working examples were set. An oscillation amplitude of the laser beam LB was set to 1.6 mm, and a laser frequency was set to 470 Hz.

Further, as shown in FIG. 8, the travel angle θ1 of the laser head 21 was set to 10°, and the travel angle θ2 of the arc torch 31 was set to 30° in both the comparative examples and working examples. In the comparative examples and working examples, the work angle θ3 of the laser head 21 and the work angle θ4 of the MIG arc 33 were both set to 90°. Further, welding was performed twice for each condition. Other conditions are as shown in FIG. 8.

In both the comparative examples and working examples, a tensile test, in which each tensile test piece was held at both of two end positions in the width direction and pulled in directions away from each other, was performed to measure the maximum test force F (N). Further, for the weld metal W contained in each tensile test piece, a length LL (mm) of a welded part, which is a length in the width direction (welding direction) of the tensile test piece, was measured. Then, joint strength was calculated using the following Formula (1).

Joint strength (N/mm)=Maximum test force $F$ (N)/Length $LL$ (m) of a welded part    Formula (1)

The weld width WL, as shown in FIG. 6, denotes a width in a length direction (direction orthogonal to the welding direction) of the tensile test piece at a part, corresponding to a boundary surface between the first metal member 1 and second metal member 2, of the weld metal W.

Further, for both the comparative examples and working examples, each cross-sectional observation test piece was polished with emery paper and etched with Tucker's solution, and then a cross-section thereof was observed with use of an optical microscope.

Figure 9:
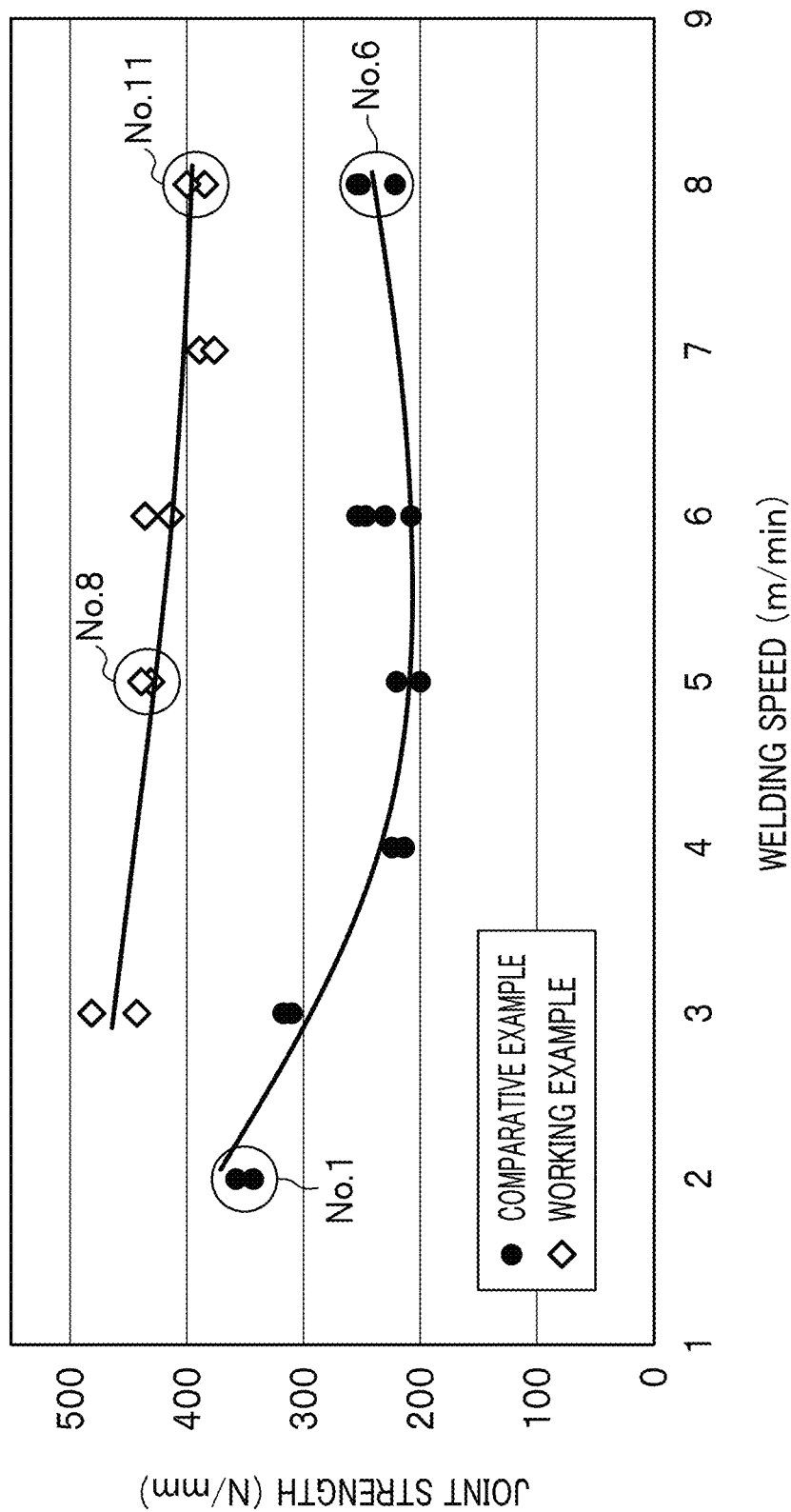
FIG. 9 is a chart showing a relationship between a welding speed and joint strength in Test 1.

FIG. 9 is a chart showing a relationship between a welding speed and joint strength in Test 1. Note that, in the tensile test, a joint part was fractured in the test pieces NOS. 8 and 9, while a base material was fractured in the test piece NO. 7. As shown in FIG. 9, the joint strength of the working examples is greater than that of the comparative examples for all the test pieces. In the comparative examples, the joint strength tends to decrease significantly when the welding speed is increased. In the comparative examples, the joint strength decreased by about 180 N/mm when the welding speed was 6 m/min, as compared with a case where the welding speed was 2 m/min.

In contrast, in the working examples, a decrease in joint strength can be suppressed even when the welding speed is increased. In the working examples, the joint strength decreased by about 80 N/mm when the welding speed was 8 m/min, as compared with a case where the welding speed was 3 m/min.

Figure 10:
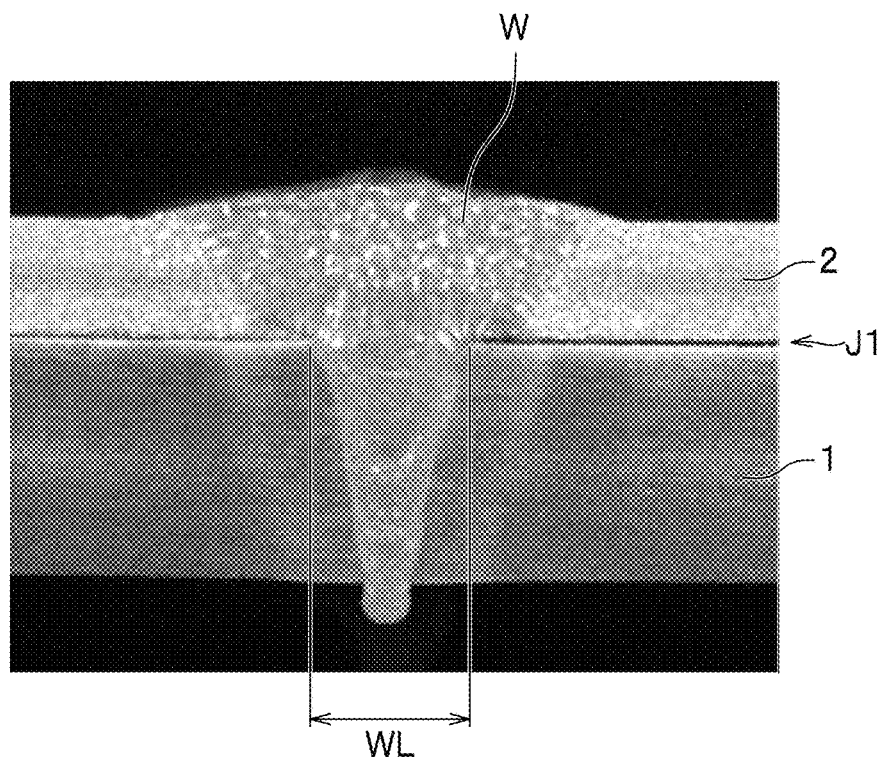
FIG. 10 shows a macroscopic cross-section of a test piece NO. 1 in Test 1.
Figure 11:
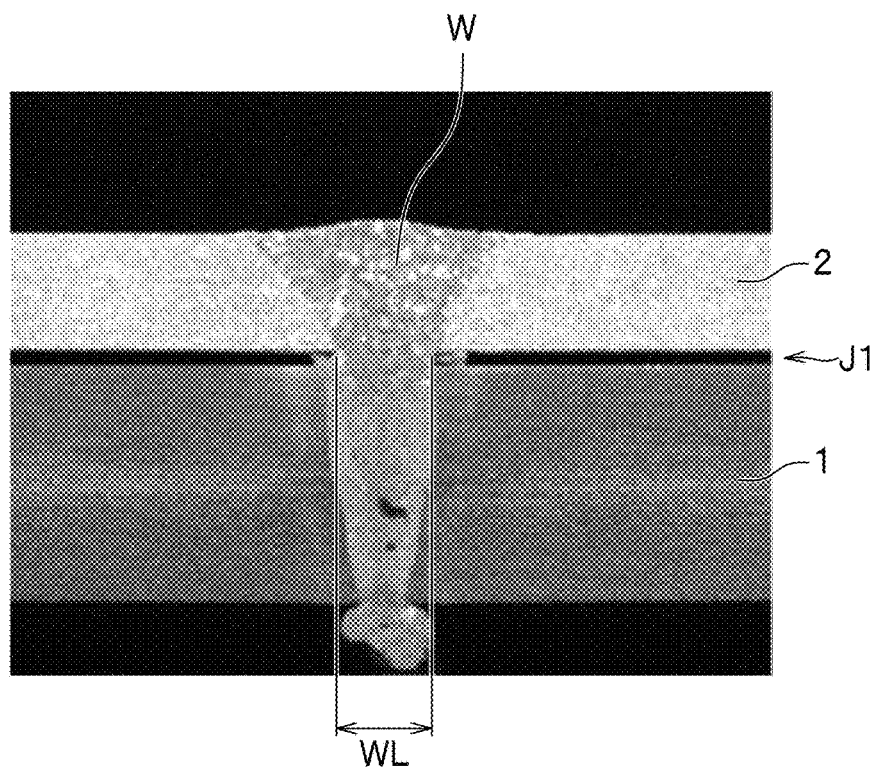
FIG. 11 shows a macroscopic cross-section of a test piece NO. 6 in Test 1.

As shown in FIG. 10, for the test piece NO. 1 in the comparative example, the welding speed was as slow as 2 m/min so that the weld width WL of the weld metal W at the overlapped part J1 was relatively large. However, as shown in FIG. 11, for the test piece NO. 6 in the comparative example, the welding speed was as fast as 8 m/min so that the weld width WL of the weld metal W at the overlapped part J1 was small.

Figure 12:
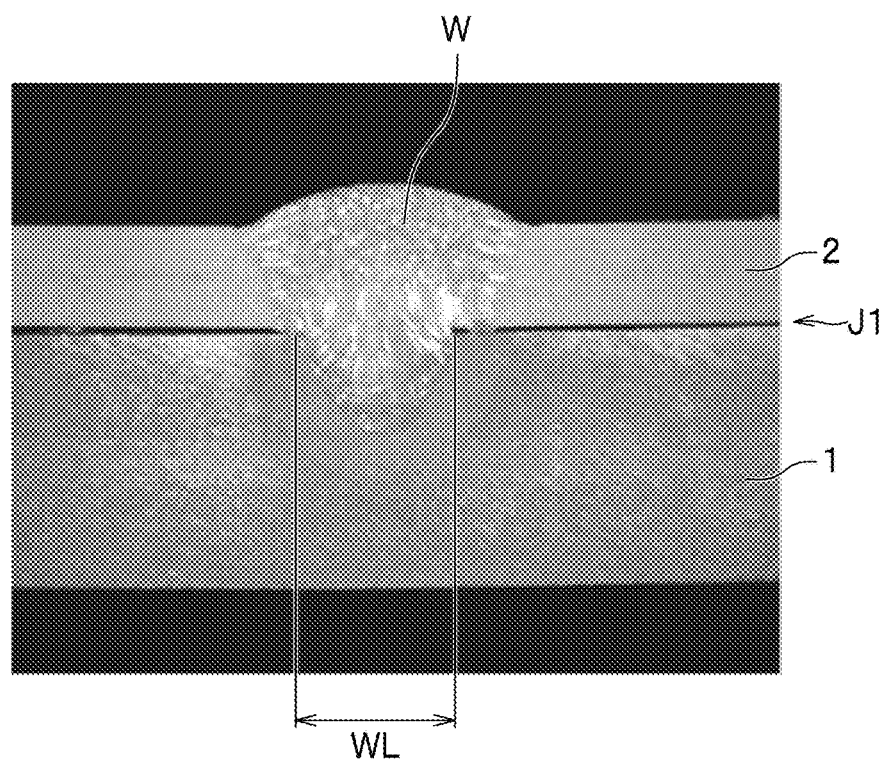
FIG. 12 shows a macroscopic cross-section of a test piece NO. 8 in Test 1.
Figure 13:
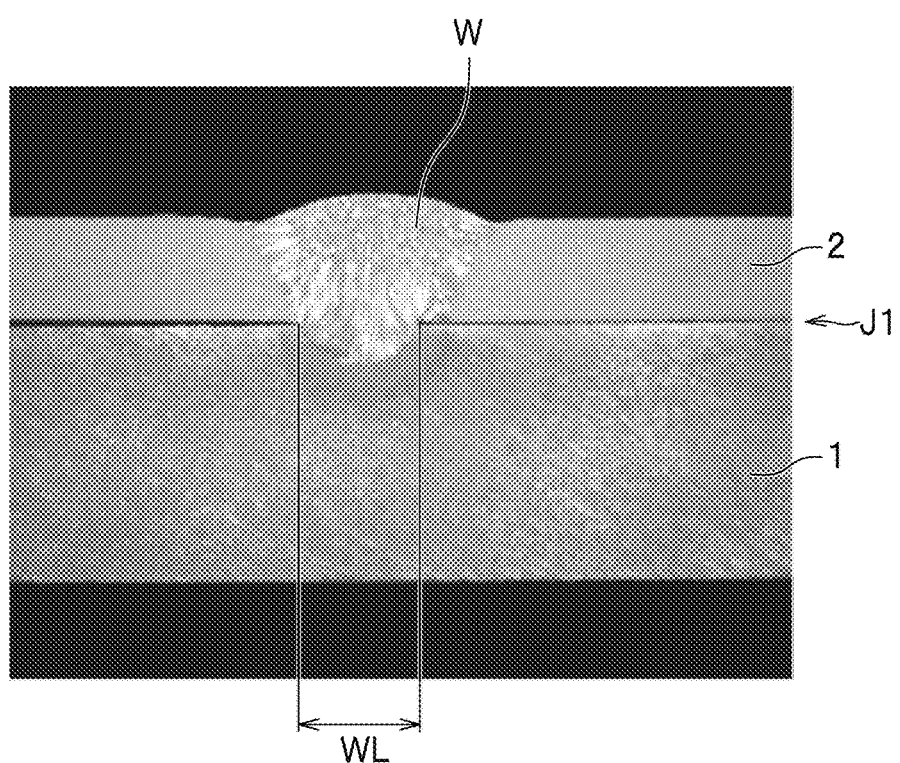
FIG. 13 shows a macroscopic cross-section of a test piece NO. 11 in Test 1.

In contrast, as shown in FIGS. 12 and 13, for the test piece NO. 8, the welding speed was set high to 5 m/min, and for the test piece No. 11, the welding speed was set high to 8 m/min in the working examples, but the weld width WL of the weld metal W at the overlapped part J1 can be increased. Thus, according to the working examples, it was found that, even when the welding speed was set high, high joint strength was obtained.

<Test 2>

In Test 2, the first metal member 1 was joined with the second metal member 2 with use of the hybrid welding machine 10, to obtain test pieces each having a lap joint. Further, a tensile test piece and a cross-sectional observation test piece were prepared from each test piece to perform a joint strength test (tensile test) on the lap joint and to observe a macroscopic cross-section thereof. FIG. 14 is a table showing welding conditions of comparative examples and working examples in Test 2.

In Test 2, an aluminum alloy A6061-T6 was used as the first metal member 1, having a thickness t of 12 mm, a width of 150 mm, and a length of 150 mm. Meanwhile, an aluminum alloy A6061-T6 was used as the second metal member 2, having a thickness t of 4 mm, a width of 150 mm, and a length of 150 mm for test pieces NOS. 21 to 26, and having a thickness t of 3 mm, a width of 150 mm, and a length of 150 mm for test pieces NOS. 27 to 32. A width (overlapped margin) of the overlapped part J1 was set to 60 mm. At the center in the width direction of the overlapped part J1, the preset travel route L1 was set in parallel to the end surface 2a of the second metal member 2.

For the test piece NO. 21, an oscillation amplitude of the laser beam LB was set to 0 mm (not oscillated). A ratio α of an oscillation amplitude to an upper plate thickness is 0.

Note that the function α is a numerical value obtained by dividing the oscillation amplitude λ of the laser beam LB by the upper plate thickness t. The upper plate thickness t denotes a plate thickness of the second metal member 2 arranged on the upper side.

For the test piece NO. 22, the oscillation amplitude of the laser beam LB was set to 0.8 mm and the frequency was set to 700 Hz. The ratio α of the oscillation amplitude to the upper plate thickness is 0.20.

For the test piece NO. 23, the oscillation amplitude of the laser beam LB was set to 1.6 mm and the frequency was set to 474 Hz. The ratio α of the oscillation amplitude to the upper plate thickness is 0.40.

For the test piece NO. 24, the oscillation amplitude of the laser beam LB was set to 2.4 mm and the frequency was set to 387 Hz. The ratio α of the oscillation amplitude to the upper plate thickness is 0.60.

For the test piece NO. 25, the oscillation amplitude of the laser beam LB was set to 3.2 mm and the frequency was set to 335 Hz. The ratio α of the oscillation amplitude to the upper plate thickness is 0.80.

For the test piece NO. 26, the oscillation amplitude of the laser beam LB was set to 4.0 mm and the frequency was set to 300 Hz. The ratio α of the oscillation amplitude to the upper plate thickness is 1.00.

For the test piece NO. 27, the oscillation amplitude of the laser beam LB was set to 0.8 mm and the frequency was set to 700 Hz. The ratio α of the oscillation amplitude to the upper plate thickness is 0.27.

For the test piece NO. 28, the oscillation amplitude of the laser beam LB was set to 1.6 mm and the frequency was set to 474 Hz. The ratio α of the oscillation amplitude to the upper plate thickness is 0.53.

For the test piece NO. 29, the oscillation amplitude of the laser beam LB was set to 2.4 mm and the frequency was set to 387 Hz. The ratio α of the oscillation amplitude to the upper plate thickness is 0.80.

For the test piece NO. 30, the oscillation amplitude of the laser beam LB was set to 3.2 mm and the frequency was set to 335 Hz. The ratio α of the oscillation amplitude to the upper plate thickness is 1.07.

For the test piece NO. 31, the oscillation amplitude of the laser beam LB was set to 4.0 mm and the frequency was set to 300 Hz. The ratio α of the oscillation amplitude to the upper plate thickness is 1.33.

For the test piece NO. 32, the oscillation amplitude of the laser beam LB was set to 4.8 mm and the frequency was set to 274 Hz. The ratio α of the oscillation amplitude to the upper plate thickness is 1.60.

After the test pieces NOS. 21 to 32 had been prepared, tensile test pieces were cut out for a tensile test, as in Test 1. Further, cross-sectional observation test pieces were cut out for cross-sectional observation, as in Test 1.

Figure 15:
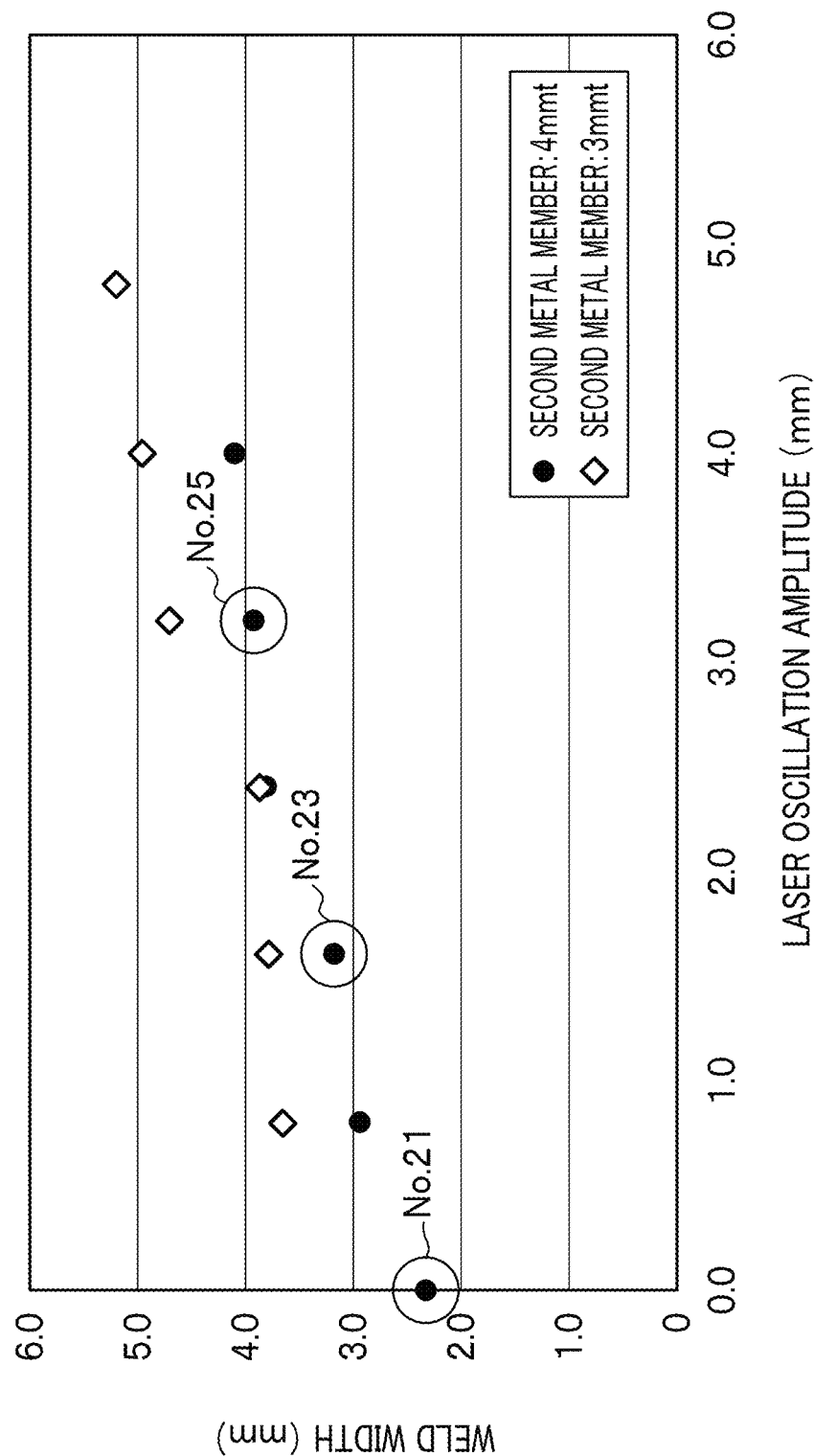
FIG. 15 is a chart showing a relationship between laser oscillation and a weld width in Test 2.

FIG. 15 is a chart showing a relationship between the laser oscillation amplitude and the weld width in Test 2. As shown in FIG. 15, it was found that test pieces in which the laser beam LB was oscillated had larger weld widths WL than the test piece NO. 21 in which the laser beam LB was not oscillated. Further, it was found that a test piece with the upper plate having a thinner thickness (3 mm) had a larger weld width WL than that with the upper plate having a thicker thickness (4 mm).

Figure 16:
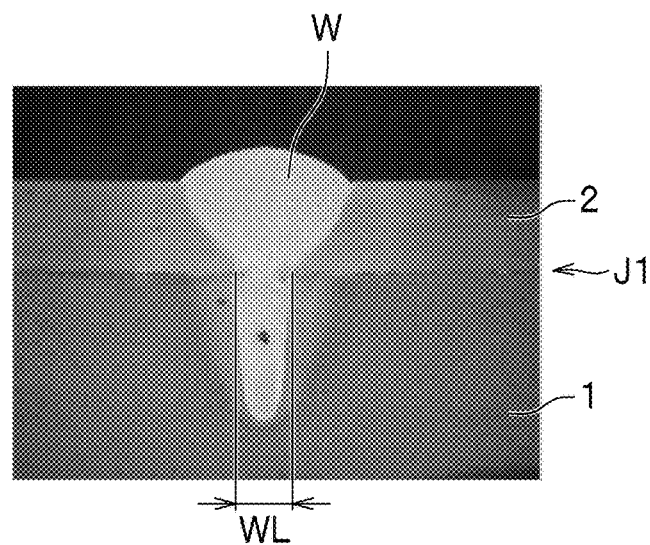
FIG. 16 shows a macroscopic cross-section of a test piece NO. 21 in Test 2.
Figure 17:
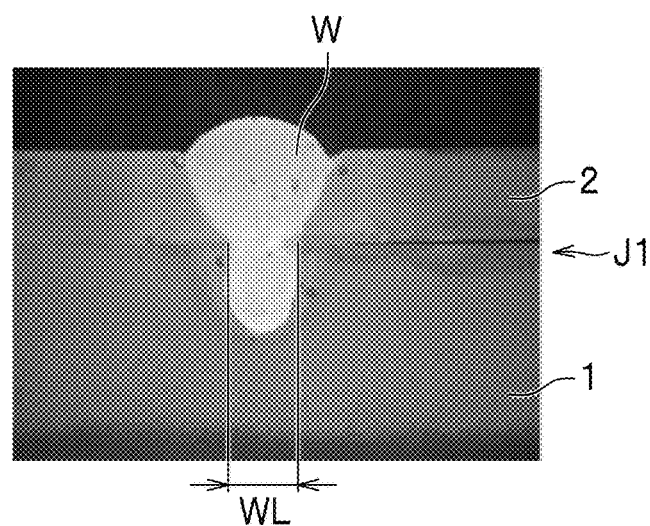
FIG. 17 shows a macroscopic cross-section of a test piece NO. 23 in Test 2.
Figure 18:
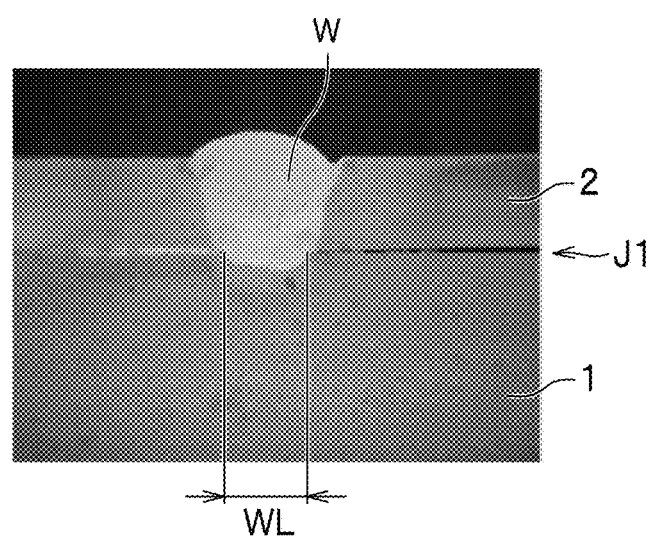
FIG. 18 shows a macroscopic cross-section of a test piece NO. 25 in Test 2.

Further, regardless of the plate thickness of the upper plate, it was found that the larger the laser oscillation amplitude was, the larger the weld width WL was. When macroscopic cross-sections of NO. 21 in FIG. 16, NO. 23 in FIG. 17, and NO. 25 in FIG. 18 are compared with each other, the weld width WL becomes larger as the laser oscillation amplitude increases. Note that, in the case of the test piece NO. 25 shown in FIG. 18, a weld depth was smaller than the others, but the laser beam LB was oscillated more than the others, and it was found that the weld width WL was larger than the others.

Figure 19:
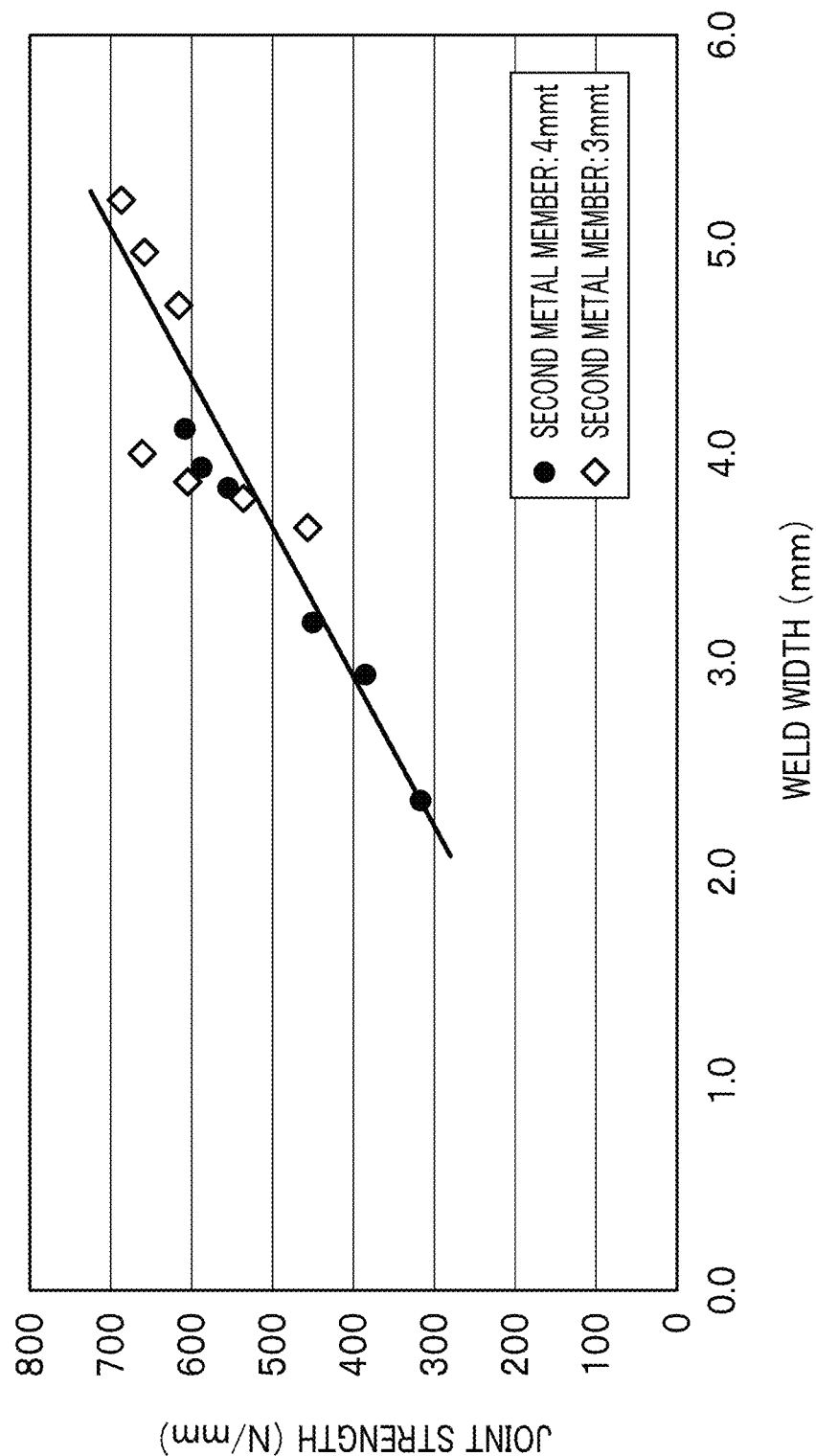
FIG. 19 is a chart showing a relationship between the weld width and joint strength in Test 2.

Further, as shown in FIG. 19, the weld widths WL and joint strength have a proportional relationship, and it was found that the larger the weld width WL was, the greater the joint strength was.

Figure 20:
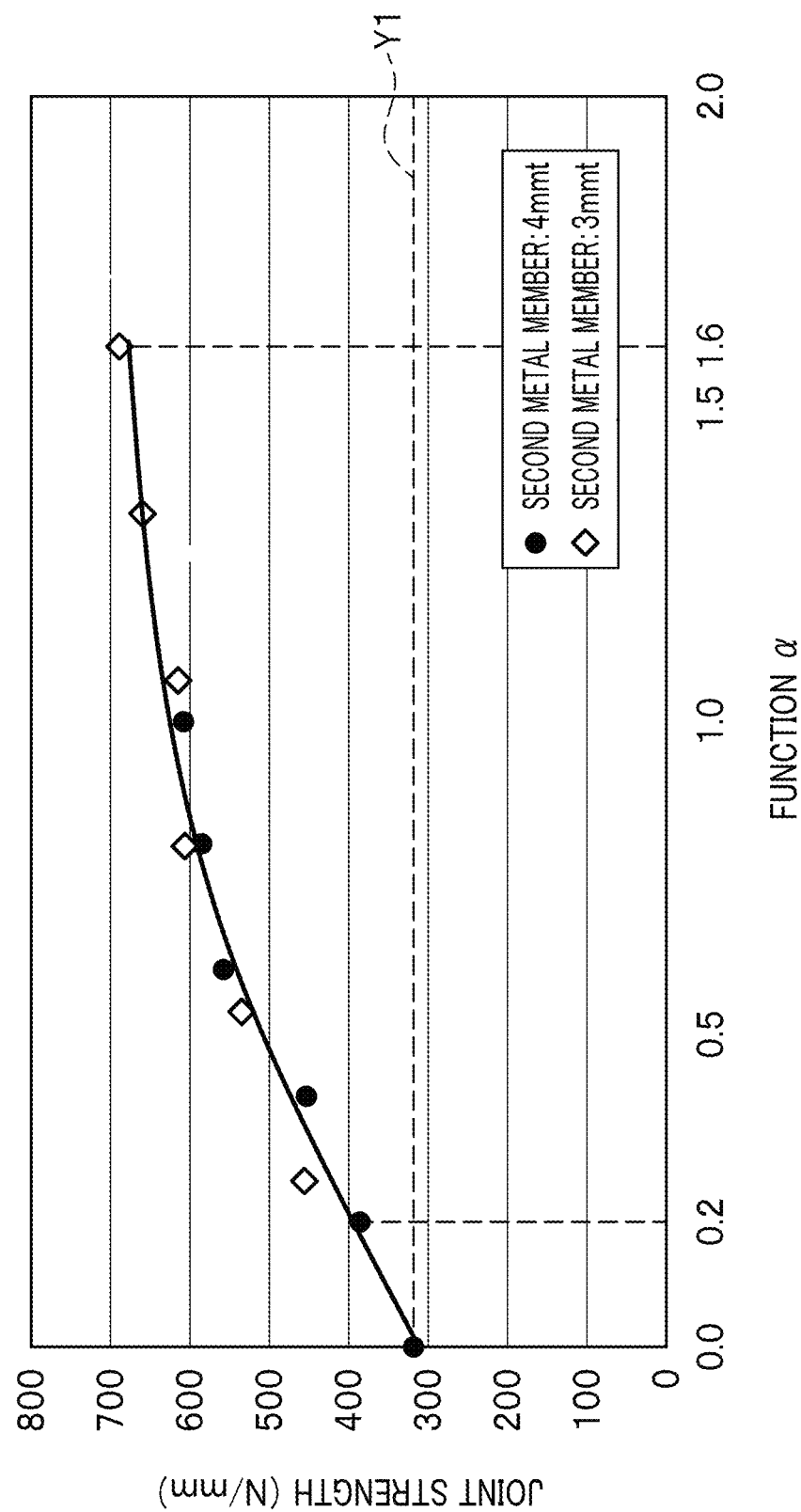
FIG. 20 is a chart showing a relationship between a function α and the joint strength in Test 2.

FIG. 20 is a chart showing a relationship between the function α and the joint strength in Test 2. A result Y1 indicates the joint strength of the test piece NO. 21 (comparative example) in which the laser beam LB was not oscillated. As shown in FIG. 20, it was found that the relationship between the function α and the joint strength had a good correlation. That is, when the function α is in a range of 0.2-1.6, the joint strength is in a range of 380-690 N/mm, to have high joint strength.

As described above, oscillating the laser beam LB allows for increasing a penetration width and increasing the weld width WL of the weld metal W at the overlapped part J1 between the first metal member 1 and second metal member 2. This can achieve both an increase in welding speed and improvement in joint strength. Further, as shown in FIG. 9, oscillating the laser beam LB allows for maintaining the joint strength, even when a welding speed is set in a range of 2-10 m/min. Still further, as shown in FIG. 20, an oscillation amplitude of the laser beam LB and upper plate thickness (thickness of the second metal member 2) are set such that the function α is in a range of 0.2-1.6, to increase joint strength.

REFERENCE SIGNS LIST

1: first metal member; 2: second metal member; 10: hybrid welding machine; 20: laser welding unit; 21: laser head; 30: MIG welding unit; 31: arc torch; 32: filler material; 33: MIG arc; L1: preset travel route; LB: laser beam; W: weld metal; θ1: travel angle of laser head; θ2: travel angle of arc torch; θ3: work angle of laser head; θ4: work angle of arc torch

What is claimed is:
1. A joining method comprising:
an overlapping step of overlapping a front surface of a first metal member with a back surface of a second metal member; and
a welding step of welding the first metal member with the second metal member by hybrid welding, with use of a hybrid welding machine including a leading laser welding unit and a trailing arc welding unit, wherein
in the welding step, laser welding, by irradiating with a laser beam, and arc welding are performed from a front surface of the second metal member, along a preset travel route which is set on an overlapped part formed by the first metal member and the second metal mem- ber overlapped with each other, on the overlapped part, and the laser beam is oscillated to cross the preset travel route at an amplitude, wherein a function, defined by dividing the amplitude of the laser beam by a plate thickness of the second metal member, is set in a range of 0.2-1.6.

2. The joining method according to claim 1, wherein, in the welding step, a welding speed is set to in a range of 2-10 m/min.

3. The joining method according to claim 1, wherein the first metal member is made of aluminum or an aluminum alloy, and the second metal member is made of aluminum or an aluminum alloy.

* * * * *